United States Patent

[11] 3,629,960

| [72] | Inventor | Marjorie P. Roush<br>2340 College Ave., Huntington, Ind. 46750 |
|------|----------|---------------------|
| [21] | Appl. No. | 885,869 |
| [22] | Filed | Dec. 17, 1969 |
| [45] | Patented | Dec. 28, 1971 |

[54] REMOVABLE COMPARTMENT FOR DESK TOP
5 Claims, 2 Drawing Figs.

[52] U.S. Cl. ..................................... 35/60,
108/27, 108/60, 312/196
[51] Int. Cl. ..................................... A47b 41/00
[50] Field of Search ........................................... 35/60;
108/60, 64, 27; 312/196, 140.4; D33/7, 11; 273/94
R; 281/30

[56] References Cited
UNITED STATES PATENTS

| 565,511 | 8/1896 | Schmidt | 281/30 UX |
| 1,489,796 | 4/1924 | Stoughton | 281/30 |
| 2,867,045 | 1/1959 | Millgate | 35/60 |
| 2,944,861 | 7/1960 | Lessin | 108/60 UX |
| 3,181,176 | 5/1965 | Nagy | 108/27 X |
| 3,220,767 | 11/1965 | Hendrickson | D33/11 UX |
| 3,326,147 | 6/1967 | Toney | 108/60 X |
| 3,414,987 | 12/1968 | Lindenauer | 35/60 |

Primary Examiner—Harland S. Skogquist
Attorney—Jeffers & Young

ABSTRACT: A removable desk top packet containing multiple learning and teaching devices, which is comprised of three panels of cardboard or the like which surrounds the top of the desk, the middle panel being slotted to receive an edge of the desk to hold the panels in an upright position, and a buckle draws the two side panels together against the sides of the desk in order to form an enclosure at the desk so that each student can see and handle and work with learning and teaching aids which are available for mounting on the interior sidewalls and exterior walls of the panels.

PATENTED DEC 28 1971

3,629,960

INVENTOR
MARJORIE P. ROUSH
by JEFFERS & YOUNG
Attorneys

REMOVABLE COMPARTMENT FOR DESK TOP

BACKGROUND OF THE INVENTION

It has been found that students in the elementary grades and especially those in the early elementary grades, need colorful and manipulative teaching aids for maximum import on students in the process of importing skills and information. Teachers have found that these aids are helpful to the student and to the teacher and if they are accessible to the student they will be more likely to be used. The present invention intends to make such teaching aids available and accessible to each student in a practical manner and in the privacy of his own "office."

In order to form good study and listening habits, student privacy can be achieved by surrounding the desk space of each student with panels which are of a sufficient height so that there is a private work and study space for each student. The interesting and attractive surroundings permitted by a semienclosure which serves as a mounting for teaching aids creates an improved atmosphere for concentration on the part of the student and a devotion to the task at hand, as for example, the taking of tests or the like. Also, since the student's attention is directed to the immediate work area there is less tendency and opportunity for one student to copy the work of another so that the results of tests have a greater integrity and relevance to a respective student. At the same time the compartment does not create a sense of isolation of the student which could be objectionable and actually distractive to young students. On the contrary, an attractive but nevertheless semienclosed compartment can serve to have an attention-directing effect on the student without creating an impression of total isolation.

The compartment can be readily mounted and demounted as the teacher may require for classroom work.

It has been further found that many students respond to the use of models and individual letters which are associated not with the classroom as a whole, but with each individual student thus giving each student maximum opportunity for individual initiative and individual experimentation and usage of the models. This device encourages pupils to listen to directions for themselves and to work independently as they cannot copy without obvious maneuvering. The teacher knows the resulting work is the individuals own work.

The compartmentalized means can also provide a convenient series of display panels upon which model work areas can be assigned.

OBJECTIVES OF THE INVENTION

It is an object of the present invention to provide a readily mountable and demountable series of panels on standard classroom desks to provide individual "offices" for each desk occupant which will provide a pleasant but effective separation of each student.

Another object of the present invention is to provide a teaching aid for each pupil by providing individual teaching models and aids on the interior wall of the panels so that each pupil can work separately and independently and, the work product of each student is more effectively safeguarded from adjoining students.

Another object of the invention is to provide a simple and inexpensive teaching device in the form of an enclosure which either the teacher or the student can readily mount and demount to provide individual teaching cubicles at each desk appropriate for testing and learning functions many of which are best conducted in a greater degree of student privacy.

A further object of the invention is to provide a device whereby individual students can be equipped at their desk with a removable enclosure so that the student can perform tasks, if need be, separate and apart from the remainder of the class thus enabling special testing and makeup work for that student.

Other objects and features of the present invention will become apparent from a consideration of the following description which proceeds with reference to the accompanying drawings.

DRAWINGS

FIG. 1 is an isometric view of the panels forming the compartments and the interior or inner cubicle side and separated from the desk; and, FIG. 2 is an isometric view showing the panels after they are in place surrounding the outer edges of the desk in which one edge of the desk protrudes through a slot of the front panel and a cincture or belt which draws the two side panels together.

DETAILED DESCRIPTION OF THE INVENTION

Figure 1:
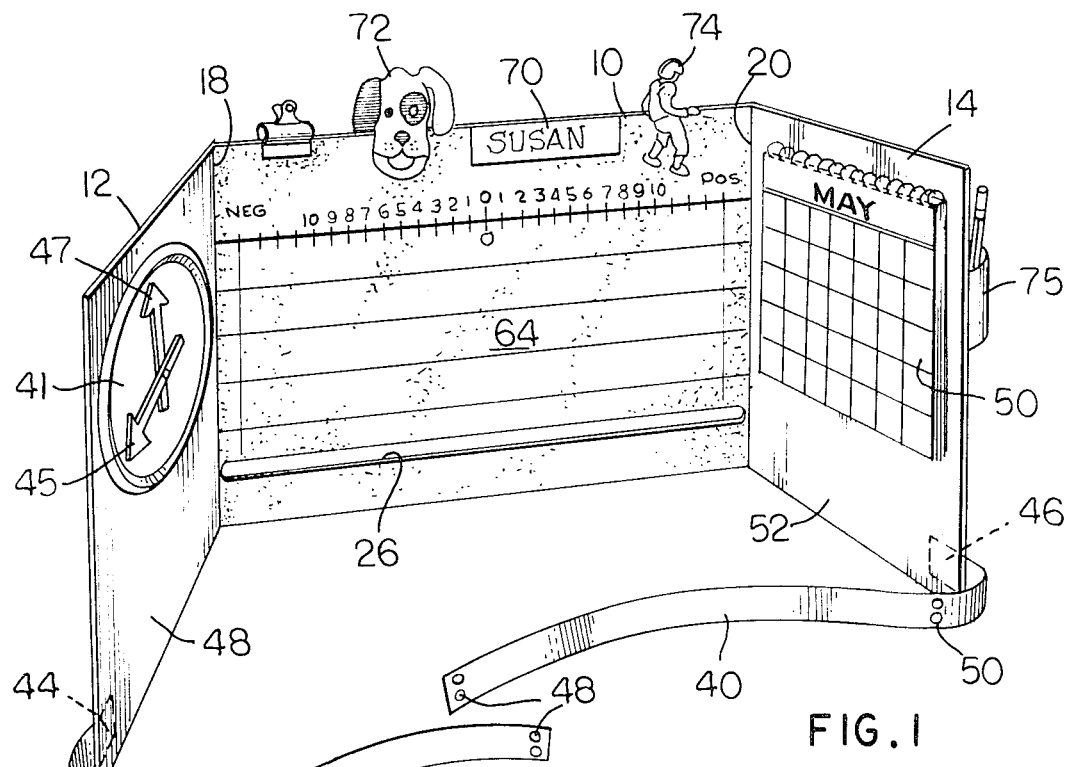

Referring to the drawings and specifically to FIG. 1, a front panel 10 and two side panels 12 and 14 are integrally constructed with the two side panels 12 and 14 having hinge seams 18 and 20 with the front panel 10.

Figure 2:
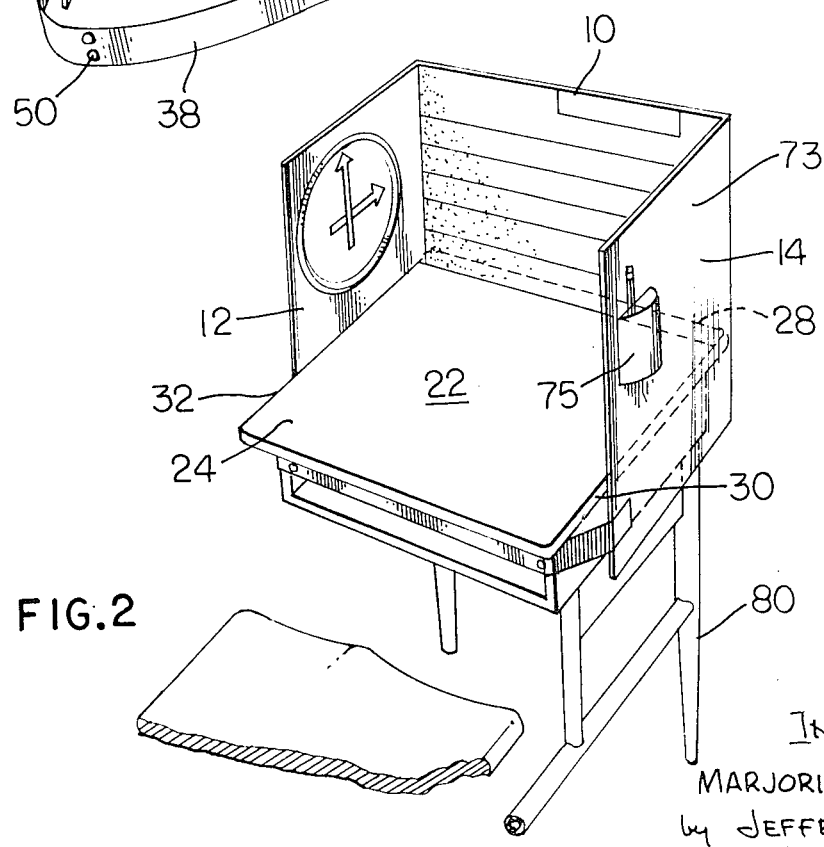

The panels are stored by swinging side panels 12 and 14 together one over the other so that in stored position the entire device is of no greater outline than of the front panel 10. The three panels 10, 12 and 14 form a semienclosed compartment designated generally by reference numeral 22 in FIG. 2 surrounding each desk top 24. The front panel 10 includes a slot 26 which receives the forward edge 28 of the desk top 24 thereby supporting the front panel 10 and the two side panels 12 and 14 which are drawn together along the side edges 30 and 32 respectively. The side panels are held firmly against the side edges of the desk top by means of two straps 38 and 40 which are held at ends 44 and 46 by panels 12 and 14 respectively and are then pulled together and snap fitted by releasable snap connection 48 and 50 as indicated in FIG. 2. Each flexible belt section tends to reinforce the other and the connection is not a difficult one to make and it is well within the strength of a grade school child.

The interior walls of each panel are used to display teaching aids such as a clock 40 having movable hands 44, 46 on the interior wall 48 of panel 12 and a calendar 50 mounted on the interior surface 52 of panel 14. The front panel has a flannel display cloth 64 provided on the interior front surface so that letters and the like can be mounted through "hook and loop" connections at the back side of letters, numbers and the like. When the panels are raised forming a compartment 22 for each student the student has a degree of privacy which promotes concentration and direction of the students attention to the task at hand. Also, there is a degree of acoustical improvement in that the enclosure tends to shut out distractive sounds and therefore the individual student can give greater attention to the work assignment. It is possible in this way to semiisolate individual students from the remainder of the class for makeup work on the part of students or for various enrichments programs and also, during examinations when it is important that each student be self-reliant and protect the integrity and accuracy of individual scores. These screens are raised or lowered by the individual students as the situations within the classroom change.

It has been further found that many students respond more readily to the use of individual models and teaching aids rather than a common aid from which the entire class is taught; therefore, by means of the packet each student may have constantly available to him an individualized clock calendar, display board, flannel board with letters and numbers, number line and the like so that he may be able to experiment and develop his own creativeness through manipulative devices.

It is very easy to assemble the screen and to take it down and once it is put up it can be maintained in an upright position for as long as desired.

I have also found it convenient to use the panels to hold name tag 70 and for mounting figures for puppet plays such as a dog 72 and man 74 and the exterior of the panels can be used for display boards and can also be put to further practical use. For example, referring to FIG. 2 the exterior surface 72 of panel 14 can be equipped with a pocket 74 for receiving scissors, pencils, individual flash cards or other useful articles.

I have found the students respond very well to the compartmentalized concept and welcome its use.

The enclosure described may be used with any standard size desk 80 and it is contemplated in the present invention that other size enclosures can be readily provided in accordance with the particular dimensions of the desk found at the class room. The side panels terminate short of the end of the desk top to give additional elbow room for the student.

Although the invention has been illustrated and described in connection with a single example embodiment it will be understood that this is by no means restrictive thereof. It is reasonably to be expected that those skilled in this area can make numerous revisions and adaptations of the invention and it is intended that such revisions and adaptions will be included within the scope of the following claims as equivalents of the invention.

What is claimed is:

1. A removable educational device which is mountable and demountable at individual desks for instructing students comprising: a plurality of panels, means joining adjacent panels for flat folding thereof, said panels being proportioned to fit along the confronting edges of a school desk along three of the sides thereof and providing upright interior walls within the student's eyesight and providing suspending surfaces for a plurality of teaching means, the front one of said panels having means adapted to fit with the forward edge of said desk, a compartment formed by said panels for the individual student seated at such desk and located within reaching distance thereof, detachable fastener means extending between the end panels forming an open space for the student view and locking the panels at the rear of the desk, said fastener being coupled for securing said panels by gripping the end panels and drawing them against the confronting desk edges, mounting means on the interior walls of said surface of said panels to provide the displaying of various teacher aid elements for the student, and means forming an exterior pocket disposed at the exterior wall of one of said panels for receiving implements as pencils, scissors, flash cards and the like.

2. The removable compartment in accordance with claim 1 including a display panel mounted on the interior surface of the front panel for mounting letters and objects thereon in full view of the occupant.

3. The removable compartment in accordance with claim 2 wherein the display panel is comprised of a fabric mounting positioned at the forward panel at the interior surface thereof to provide a mounting for letters, numbers and other material thereon.

4. The improved compartment in accordance with claim 1 including a slot formed along the lower edge of the forward panel and dimensioned to receive a portion of the desk on which said panels are mounted to hold the panels in an upright assembled position.

5. The improved cubicle of claim 1 in which said fastener means are in the form of two belt sections which overlie each other and are joined on to respective panel and when joined together will draw the side panels together against the edges of the desk top.

* * * * *